Sept. 16, 1941.　　　C. M. McCARTHY　　　2,256,166
RACK FOR LAWN MOWERS
Filed Nov. 10, 1939
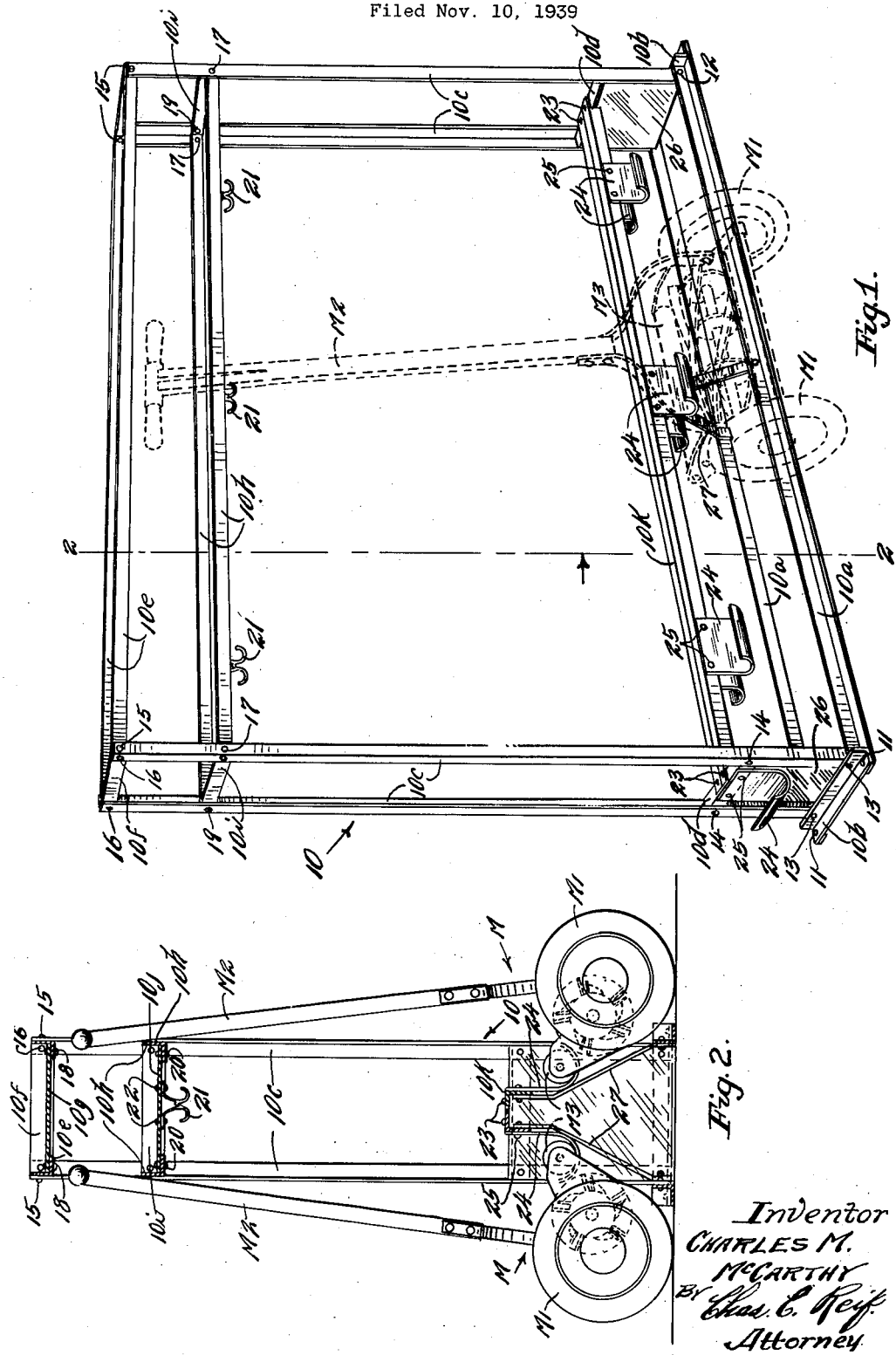
Inventor
CHARLES M.
McCARTHY
By Chas. E. Reif.
Attorney Patented Sept. 16, 1941

2,256,166

UNITED STATES PATENT OFFICE 2,256,166

RACK FOR LAWN MOWERS

Charles M. McCarthy, Minneapolis, Minn.

Application November 10, 1939, Serial No. 303,808

6 Claims. (Cl. 211—13)

This invention relates to a rack for supporting certain implements or machines and while the rack might be otherwise used it is particularly designed for use with lawn mowers. Lawn mowers are now well known and used in large numbers and the structure has become quite standardized. These lawn mowers commonly comprise supporting wheels at the sides which are geared to or connected to a rotating cutter having helical blades with their edges in the surface of the cylinder. Frame pieces project rearwardly from the mower and these support between them a small roller, the position of which relative to the frame may usually be varied.

Most hardware and other stores which sell lawn mowers have quite a few in stock and on display. Many stores have more than one make so that the number on the floor is usually considerable. Various means have been proposed for supporting or holding these lawn mowers in position for display. Some of these means comprise racks into which the lawn mower had to be lifted. The lawn mowers are quite heavy and this made quite an arduous task whenever the mower was to be placed in the rack or when it was to be removed for showing. The mowers have rather long handles and it is desirable to have them supported in as compact a condition or in as small a space as possible.

It is an object of this invention to provide a very simple and efficient means for holding the lawn mowers.

It is a further object of the invention to provide a simple and efficient means for holding lawn mowers comprising a frame which carries an outwardly extending bracket constructed and arranged to receive and hold the said roller of the lawn mower with the handle resting against an upper portion of the frame.

It is more specifically an object of the invention to provide a lawn mower rack comprising a frame having a lower member extending longitudinally thereof which carries one or more outwardly extending and preferably trough-shaped brackets into which the said roller of the lawn mower may be disposed by merely rolling the lawn mower to the rack on its wheels, together with an upper longitudinally extending portion of the frame against which the handle of the lawn mower may rest so that said lawn mower is nicely held in position.

These and other objects and advantages of the invention will be fully set forth in the following description made in connection with the accompanying drawing in which like reference characters refer to similar parts throughout the several views and in which:

Fig. 1 is a perspective view of the rack showing a lawn mower therein in dotted lines; and Fig. 2 is a vertical section of said rack taken substantially on line 2—2 of Fig. 1 as indicated by the arrow showing a pair of lawn mowers held in position by the rack.

Referring to the drawing a rack is shown comprising a frame designated generally as 10. Said frame comprises a base portion including spaced parallel members 10a. While these might be variously formed, in the embodiment of the invention illustrated they are shown as made of angle bars having their angles facing away from each other. The bottom flanges of said angle bars extend beyond the vertical flanges at their ends and transverse members 10b also shown as angle bars have their horizontal flanges secured to said extending portions in any suitable manner as by the rivets 11. A pair of members 10c extends vertically at each end of said frame, the same being illustrated as made of angle bars having their angles turned inwardly. Said members are secured at their lower ends to members 10a and 10b in any suitable manner as by the rivets 12 and 13 respectively. A bar 10d also illustrated as made of an angle bar extends between each pair of members 10c a short distance above members 10b, the same being secured to members 10c by rivets 14. Members 10e also illustrated as angle bars extend longitudinally between members 10c at each end of the frame, the same being secured to said members by rivets 15. Members 10f extend between the respective pairs of members 10c, these members being shown as flat bars and they are secured to the upper ends of members 10c by rivets 16. A plate 10g extends between members 10e and members 10f, the same resting upon the horizontal flanges of members 10e and being secured thereto by the rivets 18. Bars 10h, similar to bars 10e, extend between end members 10c some distance below the members 10e and are secured to the members 10c by rivets 17. Members 10i extend between the pairs of bars 10c some distance below the bars 10f and are secured to members 10c by the rivets 19. A plate 10j extends between members 10h and 10i, being supported upon the horizontal flanges of members 10h and secured thereto by rivets 20. It will be seen that the plates 10g and 10j form braces for the frame and particularly for uprights 10c. A plurality of hook members 21 are secured to the underside of plate 10j, the same depending therefrom and being secured thereto by rivets 22. A member 10k extends between the cross members 10d, the same being formed of two angle bars having their angles facing each other and their flanges disposed horizontally and vertically. Members 10k have their horizontal flanges extending some distance beyond their vertical flanges, the same overlying members 10d and being secured thereto by rivets 23. Brackets 24 are secured to each side of member 10k, the same facing outwardly of the rack. While these brackets 24 might be of various shapes, such as to receive and hold the roller of the lawn mower, in the embodiment of the invention illustrated they are shown as made of flat plates having their lower ends bent upwardly into substantially semi-cylindrical form to form troughs open at their upper ends. Similar brackets 24 are secured to the cross members 10d and face outwardly at each end of the rack. Brackets 24 are secured in place by any suitable means such as the rivets 25. Plates 26 are disposed between the members 10c below members 10d, said plates extending substantially to the bottom of the rack. Brace members 27 extend from members 10a substantially midway of the same, upward to and are secured to member 10k.

In operation the lawn mowers indicated in the drawings as M can be moved to the rack with their wheels M¹ rolling on the floor. The operator will move the mowers by holding the handles M² in the usual manner. When the mowers are near the rack the handle will be lowered and this will raise the rollers M³ so that they are disposed above the free edges of brackets 24. The rollers can then be moved over the brackets and when the handles M² are raised the rollers will rest in the brackets 24 as indicated in Fig. 2. The handles M² will incline inwardly and will rest against members 10h. The lawn mowers are thus held nicely in compact arrangement about the rack. Mowers can be placed in each of the brackets 24 on member 10k at either side of said member and mowers can be held in the end brackets 24. The handles of the end mowers will rest against members 10i or 10c. When the mowers are to be taken from the rack for showing or sale it is only necessary to swing the handle M² downwardly and this will raise roller M³ above the bracket 24. The mower can then be rolled away on its wheels. It will be noted that there is no lifting to be done in disposing the mowers in the rack. The mowers are nevertheless held firmly in a compactly arranged manner so that they take up little floor space. The plates 10g and 10j form shelves on which other merchandise may be placed and displayed and the hooks 21 can support other articles hung thereon. Such articles will hang down in the space between members 10c throughout the length of the frame.

The rack for holding the mowers is very rugged and yet not of excessive weight. It can thus be moved quite readily and it can be disposed somewhat spaced from and parallel to a wall if desired.

From the above description it will be seen that I have provided an extremely simple and very efficient rack for holding lawn mowers. The mowers are nicely held in the rack and little effort is required for placing them therein. The parts of the rack, of course, may be painted or coated as desired. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A rack for holding lawn mowers which have a cutting cylinder, supporting wheels at the ends of said cylinder, a small roller at one side of said cylinder and a comparatively long handle extending at right angles to the axis of said cylinder comprising a frame having a base portion adapted to rest upon the floor and a portion disposed a short distance above said base portion and a bracket projecting outwardly from said last mentioned portion and disposed at a short distance above the floor constructed and arranged to receive and hold said roller to maintain said mower adjacent said rack supported on said wheels and with said handle inclined rearwardly toward and resting against said rack.

2. A rack for holding lawn mowers which have a small roller at one side of a cutting cylinder, supporting wheels and a comparatively long handle extending at right angles to the axis of said cylinder comprising a frame having a longitudinally extending lower portion, an upper longitudinally extending portion and a trough-like bracket at said lower portion and disposed a short distance above the floor into which said roller can be moved with said wheels rolling on the floor and in which it is retained while the handle of said mower inclines rearwardly toward and rests against said upper portion.

3. A rack for holding lawn mowers having a cutting cylinder, supporting wheels, a handle extending at right angles to the axis of said cylinder and a small roller at one side of said cylinder comprising a frame having a base portion adapted to rest on the floor, spaced uprights extending vertically from said base, a portion extending longitudinally of said frame between said uprights, a comparatively small distance above said base portion, a bracket extending outwardly from said longitudinal portion and disposed a short distance above the floor constructed and arranged to receive said roller and hold the same with said mower supported on said wheels and said handle inclining toward and resting against said rack.

4. A rack for holding lawn mowers which have a cutting cylinder, supporting wheels, a handle extending at right angles to the axis of said cylinder and a small roller at one side of said cylinder comprising a frame having a base portion adapted to rest upon the floor, an upper longitudinally extending portion and a lower portion extending longitudinally of said rack a short distance above said base portion and a plurality of brackets spaced along and extending outwardly from said lower portion and disposed a short distance above the floor constructed and arranged to receive said rollers and hold the same with said wheels supporting said mowers and the handles of the lawn mowers resting in rearwardly inclined position against said upper portion.

5. A rack for holding lawn mowers having a cutting cylinder, supporting wheels, a handle extending at right angles to the axis of said cylinder and a small roller at one side of said cylinder comprising a frame having a longitudinally extending base member, uprights extending vertically from the sides of said base member at each end thereof, an upper member extending longitudinally of said rack, upper end members between said uprights at the ends of said frame respectively, a lower member extending longitudinally of said rack, a plurality of spaced brackets secured to and extending outwardly at each side of said lower member and similar brackets extending outwardly at the end portions of said rack, said brackets being disposed a short distance above the floor and each having a substantially semi-cylindrical portion to receive and hold said rollers of said lawn mowers with said mowers supported on said wheels and the handles thereof inclining rearwardly toward and resting against said upper member and end members respectively.

6. A rack for holding lawn mowers which have a cutting cylinder, a handle and a small roller at one side of said cylinder comprising a frame having a base portion in the form of a rectangle, uprights at the corners of said rectangles, members connecting said uprights at their upper ends forming a rectangular frame, a plate carried by said rectangular frame forming a shelf and a brace for said uprights, a second set of members below said last mentioned members connecting said uprights and forming a second rectangular frame, a plate carried by said second rectangular frame forming a shelf and a brace for said uprights, a member extending longitudinally and centrally of said base a short distance above the same, a plurality of spaced brackets secured to and extending outwardly at each side of said last mentioned member and disposed a short distance above the floor, the same being of trough-shaped formation to receive said rollers with said handles resting in rearwardly inclined position against said second rectangular frame and with said mower supported on said wheels.

CHARLES M. McCARTHY.